United States Patent
Ide et al.

(10) Patent No.: US 9,935,561 B2
(45) Date of Patent: Apr. 3, 2018

(54) ADAPTABLE INPUT PHASE SWITCHING

(71) Applicant: DET International Holding Limited, George Town, Grand Cayman (KY)

(72) Inventors: Peter Ide, Soest (DE); Frank Schafmeister, Warburg (DE); Jörg Richter, Soest (DE); Barzin Pour, Soest (DE); Daniel Spesser, Moensheim (DE); Dirk Herke, Kirchheim unter Teck (DE)

(73) Assignee: DET INTERNATIONAL HOLDING LIMITED, Grand Cayman (KY)

( * ) Notice: Subject to any disclaimer, the term of this patent is extended or adjusted under 35 U.S.C. 154(b) by 209 days.

(21) Appl. No.: 14/528,841

(22) Filed: Oct. 30, 2014

(65) Prior Publication Data

US 2015/0123612 A1    May 7, 2015

(30) Foreign Application Priority Data

Nov. 1, 2013  (EP) ..................................... 13191297

(51) Int. Cl.
*H02M 1/42* (2007.01)
*H02M 1/10* (2006.01)
*H02M 1/00* (2006.01)
*H02M 7/08* (2006.01)
*H02M 7/10* (2006.01)
*H02M 7/23* (2006.01)
*H02M 7/155* (2006.01)
*B60L 11/18* (2006.01)
(Continued)

(52) U.S. Cl.
CPC ......... *H02M 7/155* (2013.01); *B60L 11/1811* (2013.01); *B60L 11/1812* (2013.01);
(Continued)

(58) Field of Classification Search
CPC ............ H02M 1/42; H02M 7/08; H02M 7/12; H02M 7/17; H02M 1/10; H02M 2001/0083; H02M 7/23
See application file for complete search history.

(56) References Cited

U.S. PATENT DOCUMENTS 5,499,178 A * 3/1996 Mohan ...................... H02J 3/01
                                                         307/105
7,746,020 B2 * 6/2010 Schnetzka ............. F25B 49/025
                                                         318/611
(Continued)

FOREIGN PATENT DOCUMENTS

CN        101399459 A      4/2009
EP        2 362 522 A2     8/2011
(Continued)

OTHER PUBLICATIONS

Machine English translation of JP11-275865A ,Matsuda Yoshiaki ,Three-Phase Wide Range Input Power Converting Circuit, Aug. 1999.*

(Continued)

*Primary Examiner* — Timothy J Dole
*Assistant Examiner* — Sisay G Tiku
(74) *Attorney, Agent, or Firm* — Birch, Stewart, Kolasch & Birch, LLP (57) ABSTRACT

A power supply unit (1) that is to be connected to different types of power supply networks includes an input (2) to receive AC power from the power supply network and an output (3) for providing power to an electrical device. The electrical device may for example be a computer, a telecom infrastructure device, inductive cooking/heating systems or an on-board charger of an electrical automotive vehicle. The power supply unit (1) includes at least two converters (4) that are connected between the inputs (2) and the output (3) and it further includes a controllable switching arrangement (5). The switching arrangement (5) includes a number of controllable switches (6) to controllably connect the converters (4) in different configurations to the input (2) and therefore also controllably to different supply lines of the power supply network.

15 Claims, 3 Drawing Sheets

(51) Int. Cl.
*H02M 7/162* (2006.01)
*H02M 7/217* (2006.01)

(52) U.S. Cl.
CPC ............ *H02M 1/10* (2013.01); *H02M 7/08* (2013.01); *H02M 7/162* (2013.01); *H02M 7/217* (2013.01); *B60L 2210/30* (2013.01); *Y02T 10/7005* (2013.01); *Y02T 10/7072* (2013.01); *Y02T 10/7241* (2013.01); *Y02T 90/127* (2013.01); *Y02T 90/14* (2013.01)

(56) References Cited

U.S. PATENT DOCUMENTS

| | | | |
|---|---|---|---|
| 7,957,166 B2* | 6/2011 | Schnetzka | H02M 7/003 363/40 |
| 8,174,853 B2* | 5/2012 | Kane | H02M 1/126 363/40 |
| 8,760,128 B2* | 6/2014 | Xu | H02M 1/4216 323/207 |
| 2009/0268496 A1* | 10/2009 | Tan | H02M 1/4216 363/126 |
| 2011/0080693 A1 | 4/2011 | Tsai et al. | |
| 2012/0212984 A1 | 8/2012 | Yamada et al. | |
| 2013/0072070 A1 | 3/2013 | Tsai et al. | |
| 2015/0131343 A1* | 5/2015 | Hufnagel | H02M 1/42 363/49 |

FOREIGN PATENT DOCUMENTS

| | | | |
|---|---|---|---|
| EP | 2362522 | * | 8/2011 |
| JP | 11-275865 A | * | 8/1999 |
| JP | 11-275865 A | | 10/1999 |

OTHER PUBLICATIONS

Machine English translation of EP2362522, Mager Torsten, Charging device for an electric car, Aug. 2011.*

* cited by examiner

ADAPTABLE INPUT PHASE SWITCHING

TECHNICAL FIELD

The invention relates to a power supply unit including an input to receive AC power from an AC power source, particularly an AC power supply network, and an output for providing power to an electrical device, where the power supply unit includes at least two converters connected between the input and the output.

BACKGROUND ART

Power grids, that are power networks for the distribution of electric power from the place of its generation to the different locations where the electric power is to be used, may differ from each other in different regions of the world. Power grids may for example distribute electric power in direct current (DC) form. Modern power grids, however, distribute electrical energy usually by means of alternating current (AC) because of their superior properties for the transmission of electrical power over large distances.

AC power grids further differ in the number of phases used to distribute the energy, as well as in the amplitude and the frequency of each phase signal. In North America for example one-phase power grids are usually used whereas in Europe three phase power grids are usually used to distribute electrical power.

In many applications the electrical power distributed over the grids is not used directly to operate electrical devices. The power first is converted to provide an input power signal required by a particular product. Such products include every device that is operable directly at the public AC power grid, for example power supply units (PSUs) for computers such as servers or personal computers, storage devices and network industry as well as PSUs for telecom infrastructure. But they also include inductive cooking/heating systems or automotive chargers, particularly on-board chargers (OBCs) used in electrically driven cars and other EV (electric vehicles) or HEV (hybrid electric vehicles). Such OBCs charge the high-voltage traction battery used in such vehicles directly from the public AC power grid.

Document US 2011/0080693 discloses a power distribution unit adapted for receiving diversified three- or single-phase power. The unit includes a separable power cord as well as a separable wiring block. The separable power cord is used for receiving electric energy of input power. The separable wiring block is electrically connected with the power cord for providing at least one connection configuration. Accordingly, in order to provide different input configurations, the separable wiring block has to be manually removed and another wiring block has to be manually inserted. Therefore, the housing of the unit must include a removable cover to enable access of the wiring block.

Document US 2013/0072070 A1 discloses another distribution unit (1) including a main body, a first electric connector, and a power input module (2). The power input module is swappable to be accommodated within a receiving part of the main body. The power input module (2) is provided in different variations complying with different utility power specifications of different countries or regions. Again, in order to provide a device to be used in different regions, a part of the device has to be exchanged.

In order to use a particular device throughout two or more regions of the world having different types of power grids, different input configurations of AC power converters are therefore required. According to the prior art, provision of different input configurations is either done by manually or by exchanging certain elements of the power supply unit.

This means that different hardware variants of a specific product or at least a part of it have to be provided such that this product can be used worldwide. Due to these country or region specific variants of a particular product, not only the efforts regarding the logistic are increased but also the efforts regarding the development and the production are increased.

SUMMARY OF THE INVENTION

It is therefore the object of the present invention to create a power supply unit pertaining to the technical field initially mentioned, that can be operated at different AC grid types such that the number of country or region specific variants can be reduced.

The solution of the invention is specified by the features of claim 1. According to the invention a power supply unit with an input, an output and at least two converters connected between the input and the output as described above includes a controllable switching arrangement to connect the converters to the input of the power supply.

The controllable switching arrangement allows to controllably connect the at least two converters in a variable and controllable manner to the input of the power supply unit such that the power supply unit can be easily adapted to the different types of AC grids to which the power supply unit may be connected. And moreover, this can be done without changing the hardware of the power supply unit, simply by controllably establishing the suitable connections between the converters and the input terminals of the power supply unit required for connecting it to different types of AC power grids. There is no more need to provide country or region specific power supply units.

Most power supply grids include one, two or more phase lines and a neutral line. The number of phase lines usually is either one, two or three but can also be more than three in certain regions. In order to connect the power supply unit to most of the existing power grids, its input therefore includes in a preferred embodiment of the invention a neutral terminal and at least two phase terminals. In a further preferred embodiment the power supply unit includes exactly two or three phase terminals.

When connecting the power supply unit to a specific power grid, all or only a part of its terminals are connected to a certain line of the power grid, depending on the power grid and the desired configuration. In certain configurations the neutral terminal is for example not to be used and in case of a single phase power grid, not all of the phase terminals are necessarily connected to the phase line of the grid.

The controllable switching arrangement generally includes a certain number of input terminals for connecting to the input of the power supply unit and a certain number of output terminals for connecting to the converters of the power supply unit. The controllable switching arrangement thereby is controllable to establish electrical connections between some or all of its input terminals and some or all of its output terminals. So, each input terminal is generally connectable to each output terminal.

Accordingly, the controllable switching arrangement can be controlled such that a particular converter can generally be connected to any two of the input terminals of the power supply unit. Usually, one of the converter terminals is connected to the neutral terminal where—if present—the neutral line of the power supply network is connected to, and the second converter terminal is connected to any of the grids phase lines. Each converter can thereby be connected to different phase lines or two or more converters can be connected to the same phase line.

Providing a controllable switching arrangement where each input terminal is selectively connectable to each output terminal, can become complex and expensive. In order to reduce the number of connections to be established between the input terminals and the output terminals, and therewith also to reduce the complexity and costs of the controllable switching arrangement, the controllable switching arrangement is in a preferred embodiment of the invention, controllable to connect a first input terminal of each converter to the neutral terminal and to selectively connect a second input terminal of at least one of the converters to exactly one of the phase terminals.

In another preferred embodiment of the invention, the controllable switching arrangement is controllable to connect a first input terminal of each converter to the neutral terminal and to selectively connect the second input terminal of each converter either to a specific phase terminal of the input or to selectively connect the second input terminal of each converter to a different phase terminal of the input. Accordingly, the primaries of the converters can either be connected in parallel to a single phase terminal or they can be connected in series to two or more phase terminals, allowing different input configurations of the converters.

As already lined out above, the controllable switching arrangement is controllable to establish a certain number of electrical connections between its input terminals and its output terminals. There are different possibilities to control the switching arrangement. One possibility is to manually control it, for example by means of manually operable ON/OFF switches that are inserted into each possible connection between the input terminals and the output terminals. In this case, the controllable switching arrangement can be controlled by manually switching those switches ON where a connection shall be established and switching the other switches OFF. Accordingly, a single hardware variant of the power supply unit is sufficient to enable its connection to different types of power grids. But this solution would require some user interaction which is not desirable because the power unit may not work or may even be destroyed in case a single switch is switched to the wrong position.

In a preferred embodiment, the controllable switching arrangement is adapted to be controlled electronically. This means that the controllable switching arrangement includes controllable switches such as for example relays or transistors which can be controlled such as to establish the desired connections. The control signals usually are current or voltage signals having different levels to control the switches. These control signals can be produced by different means as explained below.

The controllable switching arrangement could generally be implemented as a separate device just for connecting the converters to the desired grid lines. However, it is preferably implemented such that it may also perform further functions.

Since AC power converters usually include a rectifier stage at the input in order to rectify the incoming AC voltage, the controllable switching arrangement includes a rectifier per converter that is connected between the input of the power supply unit and one of its converters. And each of these rectifiers includes a network of rectifying elements in order to rectify the AC input voltage to a DC voltage that is provided to the corresponding converter. Most often these rectifying elements include just diodes connected in a bridge configuration. But in this preferred embodiment of the invention, at least one of the rectifying elements of at least one of the rectifiers includes an electrically controllable switch, in particular an electrically controllable, unidirectional switch. This electrically controllable switch or these electrically controllable switches are provided instead of a diode. A properly dimensioned, designed and controlled transistor such as for example a GTOs, an IGBTs or a MOSFETs could be used for this purpose. Since some types of transistors (for example IGBTs or MOSFETs) are not able to block a reverse current, such a transistor is not provided instead of a diode but additionally to it. Preferably, a thyristor is used as an electrically controllable, unidirectional switch because a thyristor is best suited to perform the function of a controlled diode which is actually what has to be realised. Or in other words, by slightly amending the rectifiers the functionality of the controllable switching arrangement is also provided by the rectifiers. It could on the other hand also be said, that the rectifying function is performed by the controllable switching arrangement in addition to its switching function.

It is to note that the rectifier is described above to be a unit separate from the converter. In other embodiments of the invention the rectifier can however also be a part of the converter. Further it is to note that a converter usually includes other, mandatory or optional elements such as for example an output stage with an output capacitance that is connected in parallel between the output terminals. It is also possible that the converter includes more than one converter stage and it may also include further rectifier stages.

As known in the art, thyristors can be controlled in different ways. They can for example simply be switched ON at a given point in time and they switch OFF if they are for example reverse biased. Thyristors can however also be controlled by phase angle control. Now, by using thyristors as the controllable switching elements the power that is transferred by the converter from its input to its output can be controlled by varying the phase angle where the thyristors are switched ON. This technique could for example be used to precharge the output capacitor of a converter at the startup of the converter. For example, the thyristors are controlled such that only a small amount of power is transferred to the output capacitor until its fully charged or such that the amount of power transferred to the output is increased during the charging of the output capacitor.

In a further preferred embodiment of the invention, a first rectifier of the controllable switching arrangement is connected between the input and a first converter and includes two branches connected in parallel between the first and the second input of the first converter. The first branch includes two diodes connected in series where a common terminal of the two diodes is connected to the first phase terminal. The second branch also includes two diodes connected in series where a common terminal of the two diodes is connected to the neutral terminal. Whereas the first rectifier includes just two branches of rectifying elements, each remaining rectifier in this embodiment includes three branches connected in parallel between the first and the second input of the corresponding converter. The first branch includes two electrically controllable, unidirectional switches connected in series where a common terminal of the two electrically controllable, unidirectional switches is connected to a first phase terminal, the second branch includes two diodes connected in series where a common terminal of the two diodes is connected to a neutral terminal, and the third branch also includes two electrically controllable, unidirectional switches connected in series where a common terminal of the two electrically controllable, unidirectional switches is connected to a different phase terminal In order to correctly perform the rectifying function, all rectifying elements of a particular rectifier are equally orientated between the first and the second input of the first converter.

Accordingly, the first converter is connected between the neutral terminal and a first phase terminal and by suitably controlling the controllable, unidirectional switches, each second and further converter can be connected between either the neutral terminal and the first phase terminal, the neutral terminal and another phase terminal or between two phase terminals, allowing the realisation of different input configurations of the power supply unit.

In another preferred embodiment of the invention, not only the second and each further rectifier includes three branches with two of them being equipped with electrically controllable, unidirectional switches, but also the first rectifier that connects the first converter to the input of the power supply unit. By permanently switching ON the switches in the first branch and permanently switching OFF the switches in the third branch, the same function as in the previous embodiment can be achieved. However, this configuration also allows an even more flexible use of the converters in that the first converter too can be connected to different input terminals. Moreover, providing the same rectifier for all converters results in advantages regarding logistics because only one sort of rectifier has to be developed, produced, stored, processed and managed.

In a further preferred embodiment of the invention each of the electrically controllable, unidirectional switches of the first and the third branch includes a thyristor. Accordingly, the first and third branch of each rectifier can be fully controlled by controlling the electrically controllable, unidirectional switches with suitable control signals.

However, the controllable switches have to be operated with caution. By carelessly providing control signals to the switches it may happen that the switches in the first and third branch are in a state to provide a direct electrical connection between the neutral terminal and a phase terminal or between two phase terminals, resulting in possible malfunction or even damage of the power supply unit. In order to avoid such short circuits, the switching arrangement is preferably controllable to selectively and simultaneously switch the controllable, unidirectional switches of the first branch ON and the controllable, unidirectional switches of the third branch OFF or vice versa.

As used throughout the description of the current invention, the term converter may refer to any device for converting electrical power from AC to DC, from AC to AC, from DC to DC or from DC to AC. In those embodiments, where a rectifier is provided by the switching arrangement, the term converter just refers to devices for converting electrical power from DC to DC or from DC to AC. When referring to the input of the converter, the term DC not only encompasses straight DC inputs, but also pulsating DC or rectified AC input signals. Since many applications require a DC input power the converters are preferably adapted to provide DC power to their outputs.

Moreover, in those embodiments where two or more converters are in use simultaneously, their outputs are preferably connected in parallel such that the power supply unit provides a single DC signal at its output. In certain applications it may however also be suitable to provide several independent DC outputs or even two or more serially connected DC outputs.

As previously mentioned, the controllable switching arrangement can be adapted to be controlled electronically, particularly by providing controllable switches which can be controlled to establish the desired connections. The control signals to control these switches can be provided in different ways. As mentioned above it is for example possible to connect each control input to the desired voltage level by means of manually switching an ON/OFF switch. In a preferred embodiment, however, the power supply unit includes a control unit to control the controllable switching arrangement.

Such an implementation of a control unit could for example include a plurality of buttons or a rotary switch that may be switched to different positions. Each button or each position of the rotary switch represents a different input configuration of the power supply unit such that a user may choose a specific input configuration by simply pressing the corresponding button or switch the rotary switch to the corresponding position. The control unit then produces and provides the control signals to the switches of the controllable switching arrangement to produce the desired configuration.

In another embodiment, the control unit is realised as an electronic controller such as a chip or the like. The controller includes a certain number of outputs, and the control input of each controllable switch of the controllable switching arrangement is connected to one of these controller outputs. Depending on certain conditions the controller then produces the control signals to provide the desired input configuration.

The provision of these conditions can also differ. In a preferred embodiment of the invention, the controller is programmable. The programmable controller can for example be realised by a microprocessor, a DSP, a FPGA or by similar devices. Depending on the desired region of use of the power supply unit, the programmable controller can be programmed such as to provide the input configuration that meets the grid specification of that region. In case this power supply unit shall be used in a different region with different grid specifications, the controller can be programmed with another program such as to provide the input configuration of that new region. Accordingly, the selection of a particular configuration and corresponding control signals can be done purely in software by suitable programming the controller. To adapt the power supply unit to be connectable to a particular grid type, no manual change has to be performed and not housing has to be opened.

In another preferred embodiment, the conditions to provide a particular set of control signals to the switching arrangement to meet the grid specifications of the place of installation, are not provided by a preprogramed controller but are provided to the controller by means of corresponding input signals. The above mentioned examples including a plurality of buttons or a rotary switch to manually choose the desired input configuration is one example where the pressing of a button or the switching of the rotary switch to a specific position provides a corresponding signal to the controller which then controls the switching arrangement in the desired way. In another example a sensor device is provided which is adapted to sense which type of grid exists at the place of installation of the power supply unit. Once the type of grid is determined the sensor device provides a corresponding signal to the controller which in response controls the switching arrangement such that the sensed grid specifications are met. Such a sensor device may be implemented as a part of the power supply unit itself or as an external device suitably connected to the power supply unit.

As already mentioned, a power supply unit according to the invention can advantageously be applied in chargers used in EV (electric vehicles) or HEV (hybrid electric vehicles) to charge the traction battery of such vehicles directly from the public AC power grid. Such chargers may either be provided off board or more preferably on-board of the automotive vehicle. Accordingly, the invention also relates to a charging unit for charging an energy storage of an automotive vehicle. According to the invention, the charging unit includes or even consists of a power supply unit as described above for charging the traction battery of an automotive vehicle. Most often, such an energy storage includes a high voltage traction battery and the charging unit is arranged on board of the automotive vehicle.

The invention further relates to a method for providing a power supply unit for converting AC power received at an input of the power supply unit to an output power provided at an output of the power supply unit. The AC power to be received at the input is preferably provided by an AC power source, preferably an AC power supply network to which the power supply unit is connected. But it could also be any other suitable power source capable of providing AC power including one, two or more phase lines and optionally a neutral line. The method includes the steps of providing at least two converters and connecting the converters between the input and the output of the power supply. According to the invention, the method further includes the step of providing a controllable switching arrangement as described above to connect the converters to the input of the power supply unit.

Other advantageous embodiments and combinations of features come out from the detailed description below and the totality of the claims.

BRIEF DESCRIPTION OF THE DRAWINGS

The drawings used to explain the embodiments show.

In the figures, the same components are given the same reference symbols.

Preferred Embodiments

Figure 1:
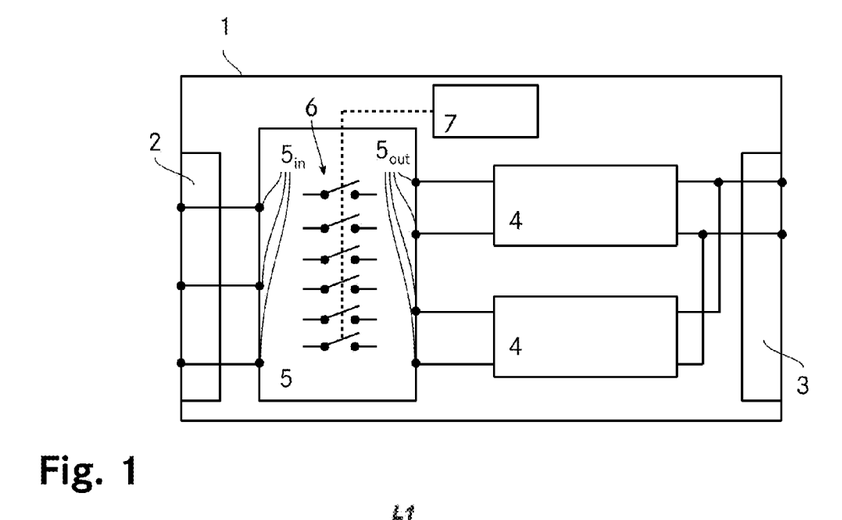
FIG. 1 a schematic depiction of a power supply according to the invention.

FIG. 1 schematically shows a power supply unit 1 according to the invention. The power supply unit 1 includes an input 2 and an output 3. With its input 2, the power supply unit 1 can be connected to different power supply grids (not shown). Although the input 2 is shown to have three lines, it may also include less or more lines to connect it to a power grid. Two (or more) converters 4 are provided to convert the input power received at the input 2 to an output power provided to the output 3. The secondary sides of the two converters 4 are connected in parallel to the output 3 of the power supply unit 1. In order to flexibly connect the converters 4 to the input 2 and therewith to the power grid to which the power supply unit 1 is connected, the power supply unit 1 further includes a switching arrangement 5. The switching arrangement 5 includes a number of input terminals $5_{in}$, a number of output terminals $5_{out}$ and a number of switches 6 where each switch is adapted to provide a connection between at least one of the input terminals $5_{in}$ and at least one of the output terminals $5_{out}$. By appropriately switching the switches 6 ON or OFF, different input configurations matching different kinds of grid configurations can be provided. In order to control the switches 6, the power supply unit 1 further includes a control unit 7.

Figure 2A:
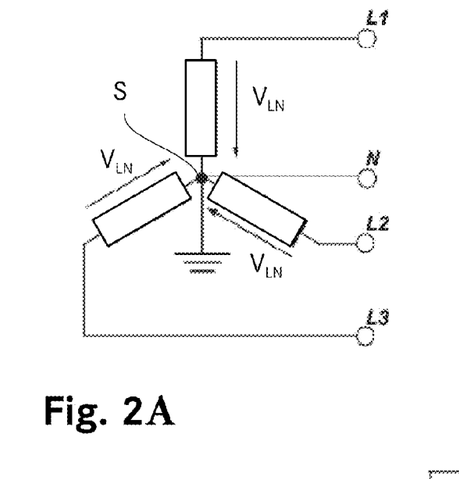
FIGS. 2A, 2B, and 2C three different power network configurations.
Figure 2B:
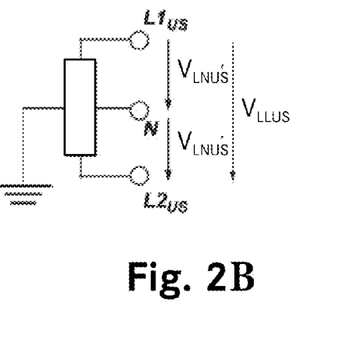
Figure 2C:
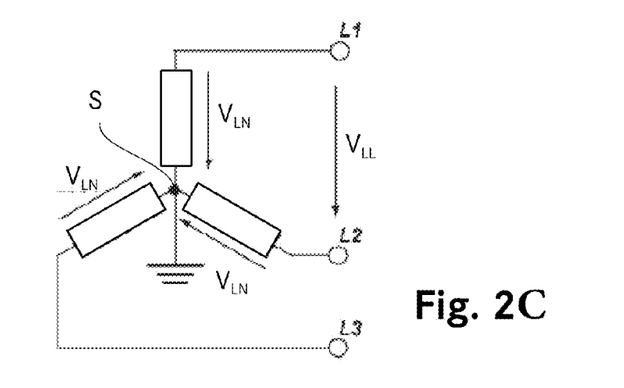

FIGS. 2A, 2B, and 2C show different configuration of power distribution networks as currently used in different regions of the world.

FIG. 2A shows an AC power network as used in Europe including a neutral line N and three phase lines L1, L2, L3 where the neutral line N is connected to the star point S. This star point S is usually connected to ground. The phase-to-line voltage $V_{LN}$ between each phase line L1, L2, L3 and the neutral line N is usually 230 Vrms (Volts root mean square), which means a voltage amplitude of 325 Vpk (Voltage peak). As known in the art, the voltage of a phase line is shifted by an angle of 120° with respect to the other phase lines.

FIG. 2B shows a power network as for example used in North America having a centre tapped single phase line resulting in a centre tapped neutral line N and two phase lines $L1_{US}$ and $L2_{US}$ referenced to the neutral line N. The phase-to-line voltage between each phase line $L1_{US}$, $L2_{US}$ and the neutral line N is usually 120 Vrms and they are shifted by an angle of 180°. The phase-to-phase voltage $V_{LLUS}$ between the two phase lines $L1_{US}$ and $L2_{US}$ therefore doubles to 240 Vrms. This phase-to-phase voltage $V_{LLUS}$ is very similar to that of the European phase-to-line voltage $V_{LN}$ as shown in FIG. 2A.

FIG. 2C shows another power network configuration used in Europe. This power network is very similar to that shown in FIG. 2A. It also includes three phase lines L1, L2, L3 as shown in FIG. 2A but does not include a neutral line. This configuration does not provide access to the neutral star point S. This kind of connection of three phase lines is called a delta connection. Accordingly, the voltage $V_{LL}$ between two phases is 400 Vrms.

In order for a product to be used worldwide, a common requirement is that such a product may be operated at all of these three types of power grids. In US residential areas the grid configuration as shown in FIG. 2B is the standard installation.

Especially for automotive on-board chargers (OBCs) it is therefore very reasonable to use this US configuration because EVs/HEVs are mainly charged at residential areas, i.e. at everyone's home where this supply is broadly available. Another reason to use this US configuration is that its phase-to-phase voltage $V_{LLUS}$ is as already mentioned very similar to the phase-to-line voltage $V_{LN}$ of the European configuration. An OBC that is to be used in Europe and the US is usually designed based on the fuse ratings in home installations in Europe of usually 16 Arms (amperes root mean square). For a given AC current rating the OBC draws at a similar AC input voltage a similar AC power from the grid when the phase-line-voltage in the European configuration and the phase-to-phase voltage in the US configuration is used. Hence, the AC power utilization is at North America's 240 Vrms supply at the same high value as in Europe, namely about 3.7 kW (kiloWatt) (=230 Vrms×16 Arms) or 3.8 kW (=240 Vrms×16 Arms) respectively. For the example of an OBC application this means very similar charging times.

Such a power supply unit may, as already mentioned, also be used as a charger for charging the traction battery of an EV/HEV. Since such traction batteries often have a comparably large capacity, such a charger that draws as much as 3 kW AC power from the grid needs to charge for several hours to fully charge such a battery. Moving to higher power levels seems necessary to shorten the charging times for improving future acceptance of EVs/HEVs.

The advantageous option of having a similar AC power utilization with North America's 240 Vrms supply vanishes when the converters power level has to be increased. In Europe the maximum rms-current in each phase is usually limited to 16 Arms. But since in most home installations a three phase AC supply is available, the next step is to also make use of one or both other phase lines. The North American 240 Vrms supply on the contrary is a single phase system. A converter configuration according to the prior art that is designed to deal with 2 or 3 phases of the European three phase system cannot draw a higher current from the North American single phase grid as 16 Arms. So when an AC power demand higher than 3.8 kW is required in US, then conventionally a specially designed converter (=OBC, PSU, etc.), or at least a special US variant has to be developed which—the other way round—cannot be appropriately used in EU.

In a European grid configuration as shown in FIG. 2A two phases could be used such that more power can be drawn from the power grid. By this measure the drawn AC power can be doubled, since each of the two phases contributes 16 Arms under the same phase voltage of 230 Vrms. The resulting power is 7.4 kW (=2*230 Vrms*16 Arms).

Figure 3A:
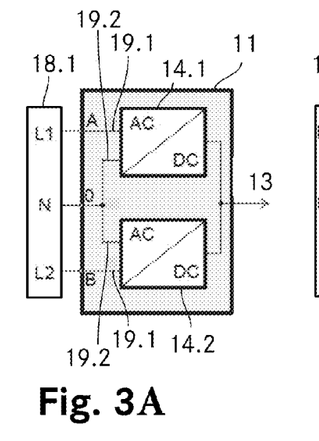
FIGS. 3A, 3B, and 3C a schematic depiction of a further embodiment of a power supply according to the invention having two converters, shown with three different input configurations.
Figure 3B:
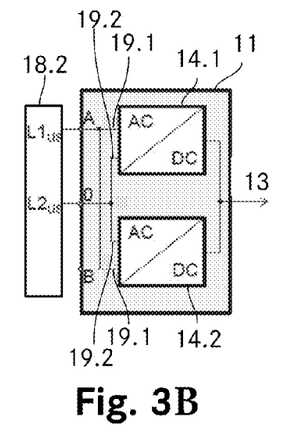
Figure 3C:
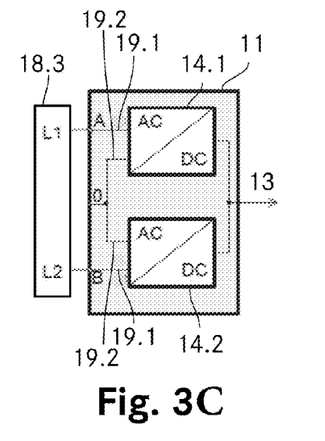

FIGS. 3A, 3B, and 3C exemplarily show a two-rail power supply unit 11 according to the invention that can be used to load two phase lines. The input of the two-rail power supply unit 11 includes three input terminals A, O and B. The power supply unit 11 includes two converter rails with a converter 14.1 and 14.2. The secondary sides of the converters 14.1, 14.2 are connected in parallel to the output 13 of the power supply unit 11. The primary sides of the converters 14.1, 14.2 are connected in series such that a second input terminal 19.2 of each converter 14.1, 14.2 is connected to the input terminal O of the power supply unit 11. Each converter rail can draw up to 16 Arms of AC current. This modular concept will be referred in the following as "2-Rail-Converter". Whereas the output of the converter stages 21.1, 21.2 are shown to provide DC power, the converter stages 21.1, 21.2 could also be designed to provide AC power. On the other side, the converter stages 21.1, 21.2 are shown to receive a rectified AC input from the rectifier stages 20.1, 20.2 but could also receive a straight DC or a pulsed DC input.

In order to operate this 2-Rail-Converter at different types of power grids, the first input terminals 19.1 of the converters 14.1, 14.2 can be connected to any of the input terminals A or B.

FIG. 3A shows the 2-Rail-Converter connected to a European grid 18.1 with neutral line N. But since only two phases L1 and L2 are used, phase line L3 is not shown. In this case, the phase line L1 is connected to the input terminal A of the power supply unit 11, the phase line L2 is connected to the input terminal B and the neutral line N is connected to the input terminal O. Therefore, the first input terminal 19.1 of the first converter 14.1 is connected to input terminal A and the first input terminal 19.1 of the second converter 14.2 is connected to input terminal B. Accordingly, at each Rail's AC input will be the phase voltage of 230 Vrms. The resulting sum of the two phase currents and the Neutral current is zero. Since the neutral current which is having the same amplitude (and therefore also same rms-value of 16 Arms) flows against the neutral voltage, which per definition is zero this current has no contribution to power. A total of about 7.4 kW (=2*16 Arms*230V rms) can be drawn.

It would generally be possible to connect the 2-Rail-Converter with the series input configuration as shown in FIG. 3A to the North American single-phase grid with 240 Vrms (including neutral or not), i.e. connecting the first input terminal 19.1 of the first converter 14.1 to input terminal A, connecting the first input terminal 19.1 of the second converter 14.2 to input terminal B and leaving the input terminal O unconnected. However, despite the fact that we have the double installed converter power the whole 2-Rail-Converter would again just draw a current of 16 Arms out of the AC line while each rail's AC input voltage is halved due to the series connection of the 2 rails at the AC side, resulting in a total power of about 3.8 kW (=2*120 Vrms*16 Arms).

FIG. 3B shows a better solution to connect the 2-Rail-Converter to a US single phase 240 Vrms grid 18.2. The converters are connected in parallel between the two US phase lines $L1_{US}$ and $L2_{US}$. The phase line $L1_{US}$ is connected to the input terminal A of the power supply unit 11 and the phase line $L2_{US}$ is connected to the input terminal O. Input terminal B is not connected to a grid line. Accordingly, the first input terminals 19.1 of both converters 14.1, 14.2 are connected to input terminal A and the second input terminals 19.2 of both converters 14.1, 14.2 are connected to input terminal O. In this way the double AC current of 2*16 Arms=32 Arms can be drawn from the single phase of the 240 Vrms supply resulting in a power of about 7.7 kW.

FIG. 3C shows the 2-Rail-Converter connected to a European grid 18.3 without neutral line. The only difference to the 2-Rail-Converter shown in FIG. 3A is the fact that the grid does not include a neutral line so the input terminal O of the power supply unit 11 in FIG. 3C is not connected to a grid line. But the converters 14.1, 14.2 are connected to the input terminals A, O and B in the same way as shown in FIG. 3A. Also in this example a total power of about 7.4 kW can be drawn.

Figure 4:
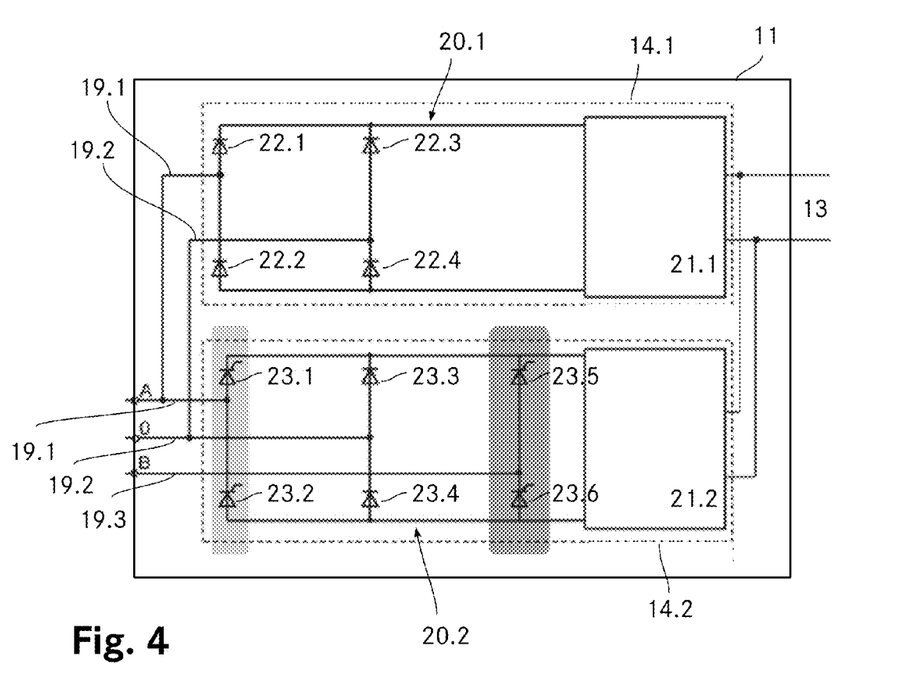
FIG. 4 a more detailed schematic depiction of the power supply shown in FIGS. 3A, 3B, and 3C, FIGS. 5A, 5B, and 5C a schematic depiction of a further embodiment of a power supply according to the invention having three converters, shown with three different input configurations and FIG. 6 a more detailed schematic depiction of the power supply shown in FIGS. 5A, 5B, and 5C.

FIG. 4 shows in more detail an exemplary implementation of the power supply unit 11 shown in FIGS. 3A, 3B, and 3C. Both converters 14.1, 14.2 include a rectifier stage 20.1, 20.2 and a converter stage 21.1, 21.2 receiving the rectified power from the corresponding rectifier stages 20.1, 20.2. The rectifier stages 20.1, 20.2 are connected to the input of the power supply unit 11 and the converter stages 21.1, 21.2 are connected to the output 13.

The rectifier stage 20.1 of converter 14.1 includes four diodes 22.1, 22.2, 22.3, 22.4 provided to form two branches (also called bridge legs later on) connected between the input terminals of the converter stage 21.1. All diodes 22.1, 22.2, 22.3, 22.4 are equally orientated. A series connection of diodes 22.1 and 22.2 forms the first branch and a series connection of diodes 22.3 and 22.4 forms the second branch. The common terminal of diodes 22.1 and 22.2 is connected to input terminal A and the common terminal of diodes 22.3 and 22.4 is connected to input terminal O.

In contrast thereto, the rectifier stage 20.2 of converter 14.2 includes three branches connected between the input terminals of the converter stage 21.2. A series connection of two thyristors 23.1 and 23.2 forms the first branch, a series connection of diodes 23.3 and 22.4 forms the second branch and a series connection of thyristors 23.5 and 23.6 forms the third branch. The common terminal of thyristors 23.1 and 23.2 is connected to input terminal A, the common terminal of diodes 23.3 and 23.4 is connected to input terminal O and the common terminal of thyristors 23.5 and 23.6 is connected to input terminal B.

This means that no extra components/efforts have to be considered for the rectifier stage 20.1 and the additional components/efforts regarding the rectifier stage 20.2 are very limited. Only two of the rectifying diodes have to be replaced by thyristors and only two additional elements, namely two thyristors are necessary compared to a conventional full bridge diode rectifier.

Accordingly, converter 14.1 is fixedly connected to input terminals A and O. But by properly controlling the thyristors 23.1 and 23.2 as well as thyristors 23.5 and 23.6 converter 14.2 can be flexibly connected to the input terminals A, O and B. By switching for example thyristors 23.1 and 23.2 ON and thyristors 23.5 and 23.6 OFF, converter 14.2 is connected between input terminals A and O. And by switching thyristors 23.1 and 23.2 OFF and thyristors 23.5 and 23.6 ON, converter 14.2 is connected between input terminals B and O. The control unit to provide the control signals to the thyristors is not shown in FIG. 4.

By connecting just one or both of the converters 14.1, 14.2 to the power grid, the power supply unit 11 can operate in a power range of about 3 to 8 kW.

In a slightly different implementation of the power supply unit 11, the rectifier stage of converter 14.1 may be implemented identical to the rectifier stage 20.2 of converter 14.2, that is by providing three branches where the first and the third branch include a series connection of two thyristors and where the second branch includes a series connection of two diodes. By permanently switching the thyristors of the first branch ON and the thyristors of the third branch OFF the same function as shown in FIG. 4 can be performed. However, the converters 14.1, 14.2 can be even more flexibly connected to the input terminals A, O and B.

Furthermore, it would also be possible to replace all diodes in these configurations by thyristors and suitably control them.

In order to further increase the power drawn from the power grid and provided to a device connected to a power supply unit, three phases of the power grid can be used if such a third phase line is available. By this measure the drawn AC power can be increased up to three times the power of a single converter, since each of the three phases contributes 16 Arms under the same phase voltage.

Figure 5A:
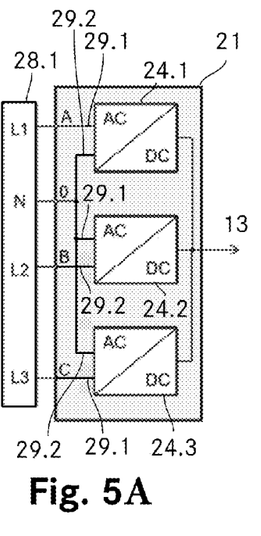
Figure 5B:
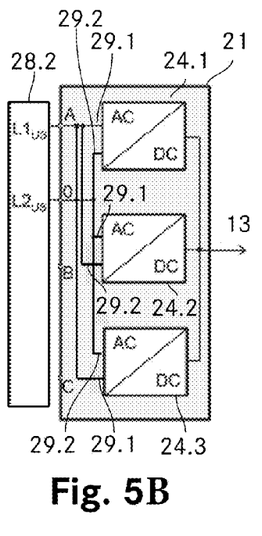
Figure 5C:
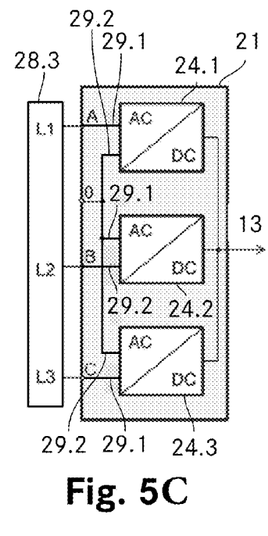

FIGS. 5A, 5B, and 5C show an example of such a three-rail power supply unit 21. The power supply unit 21 largely corresponds to the power supply unit 11 shown in FIGS. 3A, 3B, and 3C. In contrast thereto it includes four input terminals A, O, B and C and three converter rails each including a converter 24.1, 24.2 and 24.3.

Again, the secondary sides of the converters 24.1, 24.2 and 24.3 are connected in parallel to the output 13 and the primary sides of the converters 24.1, 24.2 and 24.3 are connected in star connection such that a second input terminal 29.2 of each converter 24.1, 24.2 and 24.3 is connected to the input terminal O. This power supply will be referred in the following as "3-Rail-Converter". Whereas the output of the converters 24.1, 24.2 and 24.3 are shown to provide DC power, they may also be designed to provide AC power. On the other side, the converters 24.1, 24.2 and 24.3 are shown to receive an AC input but could also be designed to receive a rectified AC or a pulsed DC input.

In order to operate this 3-Rail-Converter at different types of power grids, the first input terminals 29.1 of each the converters 24.1, 24.2 and 24.3 can be connected to any of the input terminals A, B or C.

FIG. 5A shows the 3-Rail-Converter connected to a European grid 28.1 with neutral line N. Phase line L1 is connected to the input terminal A, phase line L2 is connected to the input terminal B, phase line L3 is connected to the input terminal C and the neutral line N is connected to the input terminal O. Further, the first input terminal 29.1 of the first converter 24.1 is connected to input terminal A, the first input terminal 29.1 of the second converter 24.2 is connected to input terminal B and the first input terminal 29.1 of the third converter 24.3 is connected to input terminal C. Accordingly, at each Rail's AC input will be the phase voltage of 230 Vrms resulting in a total power of about 11 kW (=3*230 Vrms*16 Arms).

FIG. 5B shows the 3-Rail-Converter connected to a US single phase 240 Vrms grid 28.2. The phase line $L1_{US}$ is connected to the input terminal A and phase line $L2_{US}$ is connected to the input terminal O. Input terminals B and C are not connected to a grid line. Further, the first input terminals 29.1 of the converters 24.1, 24.2 and 24.3 are connected to input terminal A and the second input terminals 29.2 of the converters 24.1, 24.2 and 24.3 are connected to input terminal O such that all three converters 24.1, 24.2 and 24.3 are connected in parallel between the phase lines $L1_{US}$ and $L2_{US}$. In this way each converter draws 16 Arms resulting in a total power of about 11.5 kW (3*16 Arms*240 Vrms). In this connection it is to note that it would also be possible to connect the phase lines $L1_{US}$ and $L2_{US}$ to different input terminals of the power supply unit 21 wherefore also the first and second input terminals 29.1, 29.2 of the converters 24.1, 4.2, 24.3 would have to be connected to these input terminals.

FIG. 5C shows the 3-Rail-Converter connected to a European grid 28.3 without neutral line. The only difference to the 3-Rail-Converter shown in FIG. 5A is that the grid does not include a neutral line so the input terminal O of the power supply unit 21 is not connected to a grid line. The converters 24.1, 24.2 and 24.3 are however connected to the input terminals A, O, B and C in the same way as shown in FIG. 5A. Also in this example a total power of about 11 kW can be drawn from the grid.

Figure 6:
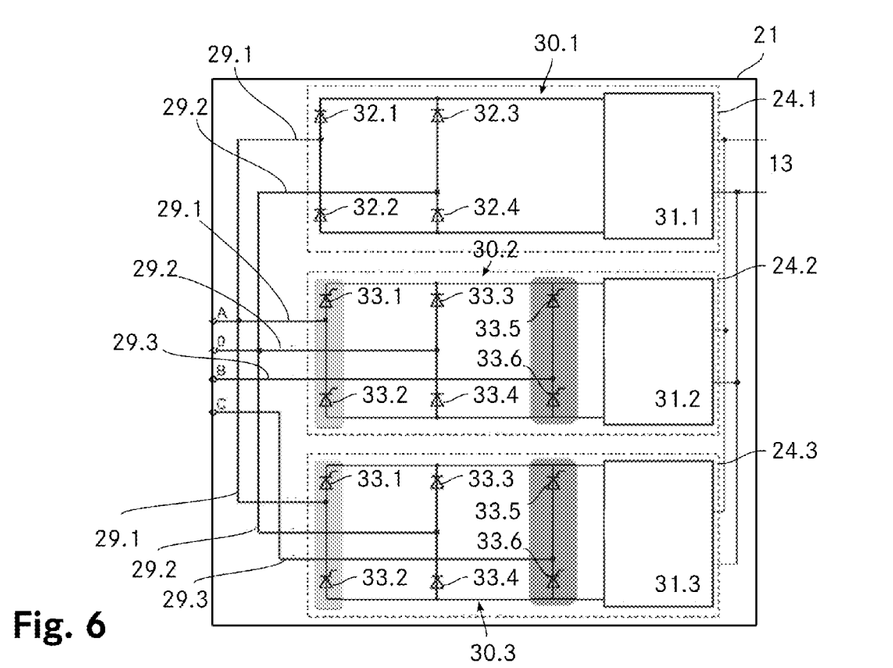

FIG. 6 shows in more detail an exemplary implementation of the power supply unit 21 shown in FIGS. 5A, 5B, and 5C. All three converters 24.1, 24.2 and 24.3 include a rectifier stage 30.1, 30.2, 30.3 and a converter stage 31.1, 31.2, 31.3 receiving the rectified power from the corresponding rectifier stages 30.1, 30.2, 30.3. The rectifier stages 30.1, 30.2, 30.3 are connected to the input of the power supply unit 21 and the converter stages 31.1, 31.2, 31.3 are connected to the output 13.

The rectifier stage 30.1 of converter 24.1 includes four diodes 32.1, 32.2, 32.3, 32.4 provided to form two branches connected between the input terminals of the converter stage 31.1. All diodes 32.1, 32.2, 32.3, 32.4 are equally orientated. A series connection of diodes 32.1 and 32.2 forms the first branch and a series connection of diodes 32.3 and 32.4 forms the second branch. The common terminal of diodes 32.1 and 32.2 is connected to input terminal A and the common terminal of diodes 32.3 and 32.4 is connected to input terminal O.

In contrast thereto, the rectifier stage 30.2 of converter 24.2 includes three branches connected between the input terminals of the converter stage 31.2. A series connection of two thyristors 33.1 and 33.2 forms the first branch, a series connection of two diodes 33.3 and 32.4 forms the second branch and a series connection of two thyristors 33.5 and 33.6 forms the third branch. The common terminal of thyristors 33.1 and 33.2 is connected to input terminal A, the common terminal of diodes 33.3 and 33.4 is connected to input terminal O and the common terminal of thyristors 33.5 and 33.6 is connected to input terminal B.

Rectifier stage 30.3 of converter 24.3 is identical to the rectifier stage 30.2 of converter 24.2. It is however connected to the input terminals of the power supply unit 21 in a slightly different way. As in converter 24.2 the common terminal of thyristors 33.1 and 33.2 is connected to input terminal A and the common terminal of diodes 33.3 and 33.4 is connected to input terminal O but in contrast to converter 24.2 the common terminal of thyristors 33.5 and 33.6 is connected to input terminal C.

Accordingly, converter 24.1 is fixedly connected to input terminals A and O. But by properly controlling the thyristors 33.1 and 33.2 as well as thyristors 33.5 and 33.6 of both rectifier stages 30.2 and 30.3 the converters 24.2 and 24.3 can be flexibly connected to the input terminals A, O, B and C. By switching for example thyristors 33.1 and 33.2 of converter 24.2 ON and thyristors 33.5 and 33.6 of converter 24.2 OFF, converter 24.2 is connected between input terminals A and O. And by switching thyristors 33.1 and 33.2 of converter 24.2 OFF and thyristors 33.5 and 33.6 of converter 24.2 ON, converter 24.2 is connected between input terminals B and O. In the same way, converter 24.3 can be connected between input terminals A and O or between input terminals C and O. The control unit to provide the control signals to the thyristors is not shown in FIG. 6.

Also in this example, the extra components/efforts are very limited. Rectifier stage 30.1 is a conventional rectifier and regarding the rectifier stages 30.2 and 30.3 only two of the conventional rectifying diodes have to be replaced by thyristors and only two additional elements, namely two thyristors per rectifier stage 30.2 and 30.3 are necessary.

By connecting either one, two or all three converters 24.1, 24.2, 24.3 to the power grid, the power supply unit 21 can operate in a power range of about 3 to 12 kW.

In this context it should be mentioned that each thyristor of a given rectifier bridge leg is basically controlled with the same control signal. It is possible and works well when actually the identical control signal is applied to both thyristors of a bridge leg. However, in order to reduce the thyristor losses and to slightly increase the converter efficiency it is preferred to deactivate a thyristor for that interval of a mains period when it is blocking the voltage anyway. I.e. depending on the position (high side or low side) of the thyristor within the bridge leg either during the positive or the negative mains half period the thyristor is switched OFF. This is also true for the other embodiments of the invention described in this document.

The concept of a modular power supply unit as described with reference to FIGS. 3A to 6 can easily be extended to power grids where more than three phase lines are available by just providing an additional rail with a converter per additional phase line of the grid including a three branch rectifier as described.

It is to mention that the connection of the grid lines to the input terminals of a power supply unit as described above has to be done by a grid specific connector type. Currently, most regions which have different electrical grid specifications as described above also have different mechanical specifications different connectors or plugs are necessary to connect a power supply unit to the grid.

It is to note that the fuse rating of 16 Arms as mentioned above is only an example and may be different in other applications and/or regions. Accordingly, other power ranges can be covered with such power supply units according to the invention.

In summary, it is to be noted that the invention enables the provision of power supply units to be used in different regions of the world having different power supply network specifications without any changes in the hardware. This is done by flexibly connecting the converters to different grid lines, depending on the actual specification of the grid where the power supply unit is to be connected. This adaptation of the power supply units to the respective supply network is done purely by software such that for example a programmable controller provides the corresponding control signals automatically to controllable switches. The invention further allows to provide power supply units for use at a conventional power supply network as widely available at homes throughout the world that are scalable in a wide range. This range starts at about 3 kW and rises up to about 12 kW.

The invention claimed is:

1. Power supply unit including an input to receive AC power from an AC power source, particularly an AC power supply network, and an output for providing power to an electrical device, where the power supply unit includes at least two converters connected between the input and the output, characterised in that the power supply unit includes a controllable switching arrangement to connect the converters to the input;
    where the controllable switching arrangement includes a rectifier per converter that is connected between the input and one of the converters, where each rectifier includes a network of rectifying elements and where at least one of the rectifying elements of at least one of the rectifiers includes an electrically controllable, unidirectional switch; and
    where a first rectifier is connected between the input and a first converter and includes two branches connected in parallel between the first and the second input of the first converter, where
    a) a first branch includes two diodes as rectifying elements connected in series where a common terminal of the two diodes is connected to the first phase terminal,
    b) a second branch includes two diodes as rectifying elements connected in series where a common terminal of the two diodes is connected to the neutral terminal,
    and where each remaining rectifier includes three branches connected in parallel between the first and the second input of the corresponding converter, where
    c) a first branch includes two electrically controllable, unidirectional switches as rectifying elements connected in series where a common terminal of the two electrically controllable, unidirectional switches is connected to the first phase terminal,
    d) a second branch includes two diodes as rectifying elements connected in series where a common terminal of the two diodes is connected to the neutral terminal,
    e) a third branch includes two electrically controllable, unidirectional switches connected in series where a common terminal of the two electrically controllable, unidirectional switches is connected to a different phase terminal,
    where all rectifying elements of a particular rectifier are equally oriented between the first and the second input of the corresponding converter, and
    where the switching arrangement is controllable to selectively and simultaneously switch the controllable switches of the first branch ON and the controllable switches of the third branch OFF or vice versa.

2. Power supply unit according to claim 1 where the input includes the neutral terminal and at least two phase terminals.

3. Power supply unit according to claim 2 where the controllable switching arrangement is controllable to connect a first input terminal of each converter to the neutral terminal and to selectively connect a second input terminal of at least one of the converters to exactly one of the phase terminals.

4. Power supply unit according to claim 3 where the controllable switching arrangement is controllable to selectively connect the second input terminal of each converter either to a specific phase terminal of the input or to selectively connect the second input terminal of each converter to a different phase terminal of the input.

5. Power supply unit according to claim 2, where the power supply unit includes two or three phase terminals.

6. Power supply unit according to claim 1 where each of the electrically controllable, unidirectional switches of the first and the third branch includes a thyristor.

7. Power supply unit according to claim 1, where the converters are adapted to provide DC power to the output.

8. Power supply unit according to claim 7, where the converters are connected in parallel to the output of the power supply unit.

9. Power supply unit according to claim 1, including a control unit to control the controllable switching arrangement.

10. Power supply unit according to claim 9 where the control unit includes a programmable controller.

11. Charging unit for charging an energy storage of an automotive vehicle, including a power supply unit according to claim 1, where the energy storage is a high voltage traction battery and where the charging unit is arranged on board of the automotive vehicle.

12. Method for providing a power supply unit for converting AC power received at an input of the power supply unit to an output power provided at an output of the power supply unit, the method including the steps of providing at least two converters, connecting the converters between the input and the output of the power supply unit, characterised in that the method further includes a step of providing a controllable switching arrangement to connect the converters to the input of the power supply unit, according claim 1.

13. Power supply unit according to claim 1, where at least one of the rectifying elements of at least one of the rectifiers is a thyristor.

14. Power supply unit including an input to receive AC power from an AC power source, particularly an AC power supply network, and an output for providing power to an electrical device, where the power supply unit, comprises:
- at least two converters connected between the input and the output, and the power supply unit includes an electronically controllable switching arrangement to connect the converters to the input, and
- where the controllable switching arrangement includes a rectifier per converter that is connected between the input and one of the converters, where each rectifier includes a network of rectifying elements and where at least one of the rectifying elements of at least one of the rectifiers includes an electrically controllable, unidirectional switch, and
- where all rectifiers include three branches connected in parallel between the first and the second input of the corresponding converter, where
  a) a first branch includes two electrically controllable, unidirectional switches as rectifying elements connected in series where a common terminal of the two electrically controllable, unidirectional switches is connected to a first phase terminal,
  b) a second branch includes two diodes as rectifying elements connected in series where a common terminal of the two diodes is connected to a neutral terminal,
  c) a third branch includes two electrically controllable, unidirectional switches connected in series where a common terminal of the two electrically controllable, unidirectional switches is connected to a different phase terminal,
- where all rectifying elements of a particular rectifier are equally oriented between the first and the second input of the corresponding converter, and
- where the switching arrangement is controllable to selectively and simultaneously switch the controllable switches of the first branch ON and the controllable switches of the third branch OFF or vice versa.

15. Power supply unit according to claim 14 where each of the electrically controllable, unidirectional switches of the first and the third branch includes a thyristor.

* * * * *